(12) United States Patent
Fergason (10) Patent No.: US 7,501,613 B2
(45) Date of Patent: Mar. 10, 2009

(54) LIGHT DETECTING AND ANGLE OF VIEW COMPENSATION FOR OPTICAL DEVICES AND METHOD

(75) Inventor: John D. Fergason, Cupertino, CA (US)

(73) Assignee: Lightswitch Safety Systems, Inc., Mountain View, CA (US)

( * ) Notice: Subject to any disclaimer, the term of this patent is extended or adjusted under 35 U.S.C. 154(b) by 0 days.

(21) Appl. No.: 10/887,195

(22) Filed: Jul. 8, 2004

(65) Prior Publication Data

US 2005/0007504 A1     Jan. 13, 2005

Related U.S. Application Data

(60) Provisional application No. 60/485,553, filed on Jul. 8, 2003, provisional application No. 60/487,781, filed on Jul. 15, 2003.

(51) Int. Cl.
*H01J 40/14* (2006.01)
(52) U.S. Cl. .................... 250/216; 351/44; 250/205
(58) Field of Classification Search ............. 250/205, 250/216, 229, 206.2, 221, 226; 349/13–14, 349/77; 351/44–45; 359/601
See application file for complete search history.

(56) References Cited

U.S. PATENT DOCUMENTS

| | | | |
|---|---|---|---|
| 3,731,983 A | 5/1973 | Fergason | |
| 3,881,809 A | 5/1975 | Fergason et al. | |
| 3,951,550 A | 4/1976 | Slick | |
| 4,039,254 A | 8/1977 | Harsch | |
| RE29,684 E | 6/1978 | Gordon | |
| 4,385,806 A | 5/1983 | Fergason | |
| 4,436,376 A | 3/1984 | Fergason | |
| 4,540,243 A | 9/1985 | Fergason | |

(Continued)

FOREIGN PATENT DOCUMENTS

CA     2076777     2/1993

(Continued)

OTHER PUBLICATIONS

PCT/EP ISA ISR (Intl. Search Report & Written Opinion of ISA.

(Continued)

*Primary Examiner*—Georgia Y Epps
*Assistant Examiner*—Kevin Wyatt
(74) *Attorney, Agent, or Firm*—Renner, Otto, Boisselle & Sklar, LLP (57) ABSTRACT

A control for a controllable optical device, such as an auto-darkening lens (ADL), such as used in welding helmets, respirators, or other device, includes a sensor sensing the direction of incident light and a control circuit responsive to incident direction information to provide for control of the optical device. Based on at least one of incident direction of light and light intensity a the shade characteristics of the ADL or the like can be controlled and maintained while a person wearing the ADL may move the head to different orientations. Several fixed photosensor arrangements and dynamic systems may be used to sense incident light direction and whether the incident light is a point source. A method of detecting direction of incident light and whether the incident light is from a point source, and of controlling an ADL or the like based on direction and/or intensity of incident light.

16 Claims, 8 Drawing Sheets

U.S. PATENT DOCUMENTS

| | | | |
|---|---|---|---|
| 4,582,396 A | 4/1986 | Bos et al. | |
| RE32,521 E | 10/1987 | Fergason | |
| 5,074,647 A | 12/1991 | Fergason et al. | |
| 5,208,688 A | 5/1993 | Fergason et al. | |
| 5,248,880 A | 9/1993 | Fergason | |
| 5,252,817 A | 10/1993 | Fergason et al. | |
| 5,298,732 A * | 3/1994 | Chen | 250/203.4 |
| 5,322,996 A * | 6/1994 | Black et al. | 250/214 AL |
| 5,347,383 A | 9/1994 | Fergason | |
| 5,510,609 A | 4/1996 | Ackermann | |
| 5,519,522 A | 5/1996 | Fergason | |
| 5,841,507 A * | 11/1998 | Barnes | 351/49 |
| 5,959,705 A | 9/1999 | Fergason | |
| 6,067,129 A | 5/2000 | Fergason | |
| 6,242,711 B1 | 6/2001 | Cooper | |
| 6,244,703 B1 * | 6/2001 | Resnikoff et al. | 351/44 |
| 6,369,952 B1 | 4/2002 | Rallison et al. | |
| 6,755,542 B2 | 6/2004 | Bechtel et al. | 359/601 |
| 6,864,473 B2 * | 3/2005 | Chretien et al. | 250/201.1 |
| 7,005,624 B2 * | 2/2006 | Hamilton | 250/205 |
| 2002/0036830 A1 | 3/2002 | Schofield et al. | |

FOREIGN PATENT DOCUMENTS

| | | |
|---|---|---|
| DE | 41 28 291 A1 | 8/1991 |
| DE | 197 14 343 A1 | 4/1997 |
| DE | 197 14 434 A1 | 4/1997 |
| EP | 0 448 173 A1 | 3/1991 |
| FR | 2 601 443 | 7/1986 |
| WO | WO 96/41231 | 12/1996 |

OTHER PUBLICATIONS

International Search Report relating to application PCT/US2004/022204 date mailed Nov. 5, 2004 and Written Opinion.

International Preliminary Report on Patentability for International Application No. PCT/US2004/022204 dated Jul. 8, 2005.

* cited by examiner

Sample LCD Contrast Map

LIGHT DETECTING AND ANGLE OF VIEW COMPENSATION FOR OPTICAL DEVICES AND METHOD

CROSS-REFERENCE TO RELATED APPLICATION

This application claims the benefit of U.S. Provisional Application Ser. No. 60/485,553, filed Jul. 8, 2003 and U.S. Provisional Application Ser. No. 60/487,781, filed Jul. 15, 2003, the entire disclosures of which are incorporated by this reference.

TECHNICAL FIELD

The present invention relates generally, as indicated, to angle of view compensation for optical devices, lenses, cameras, auto-darkening lenses and the like and method, and to the providing of such compensation for liquid crystal shutters used in auto-darkening lenses in the field of welding. The invention also relates to detecting the existence of one or more sources of light, e.g., point sources, to distinguishing between point sources and average ambient lighting, and to detecting the location or direction of a point source.

BACKGROUND

Liquid crystal cells as used in light shutters, displays, and the like have contrast variations depending on the angle at which the liquid crystal cells are viewed. Liquid crystal cells are used as controlled shutters in auto-darkening lenses for welding, e.g., being used in welding helmets, welding goggles, and respirator systems. Exemplary liquid crystal cells used in light shutters are described in the patents mentioned below; other shutters may have similar contrast variations. The contrast variations in a liquid crystal shutter used in auto-darkening lenses may result in blocking transmission of substantially all light or much of the light that is incident on the auto-darkening lens from some directions but may not block as much of the light that is incident on the auto-darkening lens from other directions or angles. A prior approach to reduce light transmission due to contrast variations in a liquid crystal shutter of an auto-darkening lens in the dark state or light blocking mode or condition, has been to design or to tailor the liquid crystal shutter. For example, one approach has been to make the liquid crystal shutter several units thick, e.g., using several liquid crystal shutters in optical series. In such an arrangement the portions of one liquid crystal shutter that tend to provide maximum light blockage for incident light at given angles are oriented to align with portions of another liquid crystal shutter that provide relatively minimum light blockage in a dark state for incident light at such given angles. The increased number of liquid crystal shutters increases the cost, weight, and power requirements for the overall auto-darkening lens using the same.

Auto-darkening lenses (sometimes referred to by the acronym "ADL") have been used in welding helmets, welding goggles, and the like to protect the eyes of a user or wearer from bright light occurring during a welding process. The auto-darkening lens may have a relatively clear or bright state allowing a relatively maximum amount of light to be transmitted to the wearer's eyes to allow the wearer to see the welding tools, etc., while setting up to do welding. Upon the initiation of welding and continuing of welding, relatively bright light detected by a photosensor associated with the auto-darkening lens will cause operating circuitry of the auto-darkening lens to drive the lens to a dark state to reduce transmission of light to the eyes of the user. If the incident light on the auto-darkening lens is at an angle for which the auto-darkening lens provides suitable light blocking function, the user's eyes will be well protected. However, if the light from the welding process is incident on the auto-darkening lens at an angle at which the auto-darkening lens provides less light blocking effect, the user's eyes will be less protected, as the auto-darkening lens has greater light transmission for light incident at such angle(s). For example, light that is incident on a liquid crystal shutter of an auto-darkening lens at an angle that is perpendicular (normal) to the plane of the liquid crystal shutter may be substantially blocked in the dark state of the light crystal shutter, whereby only a minimal amount of light would arrive at the user's eyes. However, a substantially increased transmission of light through the auto-darkening lens, although in the dark "state," may occur for light that is incident on the liquid crystal shutter from a different incident angle, for example, approximately 30 degrees down relative to horizontal and angularly toward a corner of the liquid crystal shutter. To adjust the liquid crystal shutter to block the latter light to the same extent of light blockage for the mentioned perpendicularly incident light may require additional drive voltage on the liquid crystal shutter to obtain the same dark state transmission characteristics as for the first-mentioned light that is normal to the liquid crystal shutter. Continued operation of the liquid crystal shutter at the higher voltage when the welding light returns to the mentioned normal or perpendicular direction wastes power.

Other optical devices may be sensitive to the existence of one or more point sources of light and/or to the angle and/or direction at which such light impinges on the optical device. For example, a camera lens may cause spots or other anomalies to appear on an image due to a relatively intense light incident on the camera lens at a given angle, direction and/or location. A point source may cause a wrong light intensity measurement by a camera light measuring system and lead to an over or under exposed image.

It will be appreciated that there is a need to determine the angle, location and direction of incident light generally and of incident light from one or more point sources. There also is a need to distinguish between point sources of light and average, relatively uniform ambient light.

Prior through the lens feedback systems for auto-darkening lenses have detected light transmitted through a lens and have attempted to maintain a given shade number. A problem with such through the lens feedback systems is that there is no reliable or constant light source because the light intensity from a welding arc can vary, for example, due to changes in the voltage at which the welding is carried out, the size of the welding arc, sputtering, etc., and the light transmitted through the auto-darkening lens also may vary as ambient light conditions change. Feedback control to adjust the intensity of light transmitted through the auto-darkening lens also lags (takes time) after a change in light intensity has been detected; and this can reduce accuracy of such through the lens feedback. Thus, such through the lens feedback systems may not have a fixed light intensity starting point about which to base feedback adjustments, e.g., as the light source intensity varies and, therefore, the feedback may not accurately represent the intensity of incident light, the direction from which incident light is impinging on the auto-darkening lens, etc. Similar problems may exist in other optical devices and systems used in a number of light conditions.

In the description herein reference will be made to a lens (also sometimes referred to as "welding lens," "welding filter," "shutter," and the like, and to an automatically darkening lens (sometimes referred to as auto-darkening lens) that is able to operate automatically to control transmission of light. The lens may be a light shutter type of a device that is able to control light transmission without distorting, or at least with relatively minimal distortion, of the light and the image characteristics carried by the light or represented by the light. Therefore, when a person looks through the lens, the image seen would be substantially the same as the image seen without the lens, except that the intensity of the light transmitted through the lens may be altered depending on the operative state of the lens. The lens may be used in a welding helmet, and the lens may be used in other types of devices, such as goggles, spectacles, face masks, e.g., for industry (such as in an industrial plant or to protect outdoor or indoor electrical workers), for dentistry to protect the fact of a dentist in the operative, respirator systems, nuclear flash eye protection devices, and other types of helmets, etc. Such devices usually are employed to protect the face or the eyes of a person, as is known, for example, in the field of welding and in other fields, too. Further, the lenses may be used in various other places to protect workers from bright light that could present a risk of injury. The lenses also may be used in safety eye glasses or in regular eye glasses.

For the purposes of providing eye protection, usually a welding lens provides light blocking characteristics in the visible, infrared and ultraviolet wavelength ranges. The actual ranges may be determined by the components of the lens, the arrangement of those components, and so forth. One example of such a welding lens is U.S. Pat. No. 5,519,522. The lens assembly disclosed In that patent includes several liquid crystal cell light shutters, several plane polarizers, and a reflector or band pass filter, which is able to reflect ultraviolet and infrared electromagnetic energy and possibly also some electromagnetic energy in the visible wavelength range. The several liquid crystal cells, for example, may be birefringent liquid crystal cells sometimes referred to as surface mode liquid crystal cells or pi-cells.

As will be described further below, the present invention may be used in a variable optical transmission controlling device. The device is described in detail with respect to use in a welding helmet. However, it will be appreciated that the device may be employed in other environments and in other devices and systems for controlling transmission of electromagnetic energy broadly, and, in particular, optical transmission. As used herein with respect to one example, optical transmission means transmission of light, i.e., electromagnetic energy that is in the visible spectrum and which also may include ultraviolet and infrared ranges. The features, concepts, and principles of the invention also may be used in connection with electromagnetic energy in other spectral ranges.

Examples of liquid crystal cells and shutters (the terms liquid crystal cell and liquid crystal shutter may be used interchangeably and equivalently herein unless context indicates or implies otherwise, lenses using them and drive circuits are described in U.S. Pat. Nos. 5,208,688, 5,252,817, 5,248,880, 5,347,383, and 5,074,647. In U.S. Pat. No. 5,074,647, several different types of variable polarizer liquid crystal devices are disclosed. Twisted nematic liquid crystal cells used in an automatic shutter for welding helmets are disclosed in U.S. Pat. Nos. 4,039,254 and Re. 29,684. Exemplary birefringent liquid crystal cells useful as light shutters in the present invention are disclosed in U.S. Pat. Nos. 4,385,806, 4,436,376, 4,540,243, 4,582,396, and Re. 32,521 and exemplary twisted nematic liquid crystal cells and displays are disclosed in U.S. Pat. Nos. 3,731,986 and 3,881,809. Another type of liquid crystal light control device is known as a dyed liquid crystal cell. Such a dyed cell usually includes nematic liquid crystal material and a pleochroic dye that absorbs or transmits light according to orientation of the dye molecules. As the dye molecules tend to assume an alignment that is relative to the alignment of the liquid crystal structure or directors, a solution of liquid crystal material and dye placed between a pair of plates will absorb or transmit light depending on the alignment of the liquid crystal material. Thus, the absorptive characteristics of the liquid crystal device can be controlled as a function of applied electric field.

As is disclosed in several of the above patents, the respective shutters may have one or more operational characteristics (sometimes referred to as modes or states). One example of such an operational characteristic is the shade number; this is the darkness level or value of the shutter when it is in the light blocking mode (dark state). Another exemplary operational characteristic is the delay time during which the shutter remains in a dark state after a condition calling for the dark state, such as detection of the bright light occurring during welding, has ceased or detection thereof has terminated or been interrupted. Still another operational characteristic is sensitivity of the detection circuit and/or shutter to incident light, for example, to distinguish between ambient conditions and the bright light condition occurring during a welding operation, and sensitivity also may refer to shutter response time or to the time required for the circuitry associated with the lens to detect a sharp increase in incident light (e.g., due to striking of the welding arc, etc.) and to switch the lens from the clear state to the dark state. Even another characteristic, which may be considered an operational characteristic, is the condition of the battery or other power source for the shutter, such as the amount of power remaining, operational time remaining until the power source becomes ineffective, etc. In the past various of the operational characteristics of such shutters have been adjustable or fixed. Various light sensitive devices have been used in the past to sense light incident on an ADL, such as, for example, photocells, photosensors, light sensors, light sensitive solid state devices, such as light sensitive or photosensitive diodes, photosensors, and other devices (collectively devices to sense light will be referred to herein by those terms and/or by other similar representative terms, all of which are considered equivalent). The controllable shutters (ADLs) may be used in welding helmets, respirator helmets and systems, safety eye glasses, regular eye glasses, goggles, and other devices used to protect the eyes of a wearer or user. Operating circuitry operates the shutter to assume the respective states, and the light sensor senses light conditions and provides an input to the operating circuitry to operate the shutter in response to the sensed light conditions. The photosensor (light sensor) provides an output representative of that light. The light may be in the visible, ultraviolet, infrared, or some other spectrum range or combination of ranges.

In an exemplary auto-darkening lens the sensor is placed at the front of a support structure or housing in which the shutter is mounted or the sensor may be in the support structure (e.g., housing), which is provided with an access opening to allow light to reach the sensor. The location at which the sensor is mounted on or in the support structure may be selected to allow the light sensor to receive incident light that is representative of light, which impinges on the shutter. It is desirable that the intensity of the light incident on the sensor would be representative of the light incident on the shutter. In an auto-darkening lens or other controllable light shutter device used for welding it is desirable to detect light representing the occurrence of welding and to distinguish such light from ambient light.

In electric arc welding, usually welding arcs are fairly bright light and are primarily point sources of light that are relatively small, especially compared to typical ambient light condition and light sources intended to illuminate ambient surroundings. The total amount of light that emanates from a welding arc, though, may vary, for example, depending on the size of the welding arc. For example, for a relatively small welding arc, such as that produced by a ten ampere welding arc process, the amount of light to which a person carrying out the welding process would be exposed (that person sometimes being referred to as a user, wearer or welder in this text for convenience), is about half the light to which that person would be exposed outdoors in bright sunlight, but not looking directly at the sun.

To determine whether incident light on an auto-darkening lens is due to a welding arc, the light sensor and associated operating circuitry for the controllable shutter cannot consider only absolute magnitude of the incident light because if the incident light is "spread out" and is not a point source, e.g., is ambient or is reflected off a relatively large surface, the light would not be due to welding and the eye protection desired for welding would be unnecessary. Protection from light due to welding, for example, emanating from a point source, is desirable because that point source light tends to focus on the retina of the eye and may cause eye damage and/or eye fatigue.

Prior light sensors and associated operating circuitry for controllable shutters have encountered some difficulties in determining whether incident light is from a point source, such as that due to welding, or is from a bright ambient light condition. One reason for this difficulty is the sometimes relatively low signal to noise ratio effect, whereby it is difficult to discern the sensing of a point source of light relative to ambient light conditions.

In some light sensor arrangements several photosensors arranged in a relatively large rectangular array are used to sense light incident thereon, and substantial electronic processing is needed to determine whether the incident light is from a point source. However, since a number of the photosensors are illuminated simultaneously there is a relatively low signal to noise ratio, e.g., ratio of point source light to ambient light, and, therefore, the electronic processing may require a relatively large amount of power and time to determine whether point source light is being detected.

For control of the controllable shutter and/or for other purposes it also is desirable in some instances to detect the location from which incident light due to welding is coming. By detecting the direction of incident light it is possible to control a controllable shutter in such a way to assure that light from that incident direction is suitably attenuated to provide desired protection for the eyes of a welder or the like.

Thus, it will be appreciated that there is a need for accurately detecting occurrence of welding and/or the occurrence of other point light sources or the like.

Dynamic operational range or dynamic optical range is the operational range of the lens between the dark state and the clear state, e.g., the difference between the shade numbers of the dark state and the clear state.

An example of a "welding lens with integrated display and method" is disclosed in U.S. Pat. No. 6,067,129. In the invention disclosed therein the current operational characteristics of the shutter can be displayed and can be selectively changed by operating one or more switches. The switches may be flexible membrane switches, microswitches, or another type of switch.

The present invention is useful for eye protection by an automatic darkening light shutter in a helmet or goggle assembly or in another device, if desired. The switching mechanism for powering the light shutter on and off and/or for selecting operational characteristics may be an integral part of the light shutter and/or frame assembly or other component or portion thereof.

The light shutter, photosensor arrangement and/or control of the present invention may be used in a variety of embodiments and applications. The shutter is adjustable to control light, i.e., to increase or to decrease the amount of the incident light that is transmitted through the shutter. When welding is not occurring, for example, the shutter in a welding helmet may be substantially optically clear or transmissive or at least minimizes its attenuation of light. When welding is occurring, the shutter may be dark or closed to reduce the amount of light transmitted therethrough in order to protect the eyes of the person performing the welding and to maximize his or her viewing comfort. In both cases, though, the image characteristics of the light preferably remain intact. A photosensitive device may be used to sense the intensity of light impinging in the area of the shutter so as to provide an input to a drive circuit for the shutter in order to control opening and closing thereof.

The disclosures of the patents identified herein are incorporated in their entirety by reference.

SUMMARY

An aspect of the invention relates to a control for a controllable optical device, including a sensor to sense the incident direction of incident light, and a control circuit responsive to incident direction information to provide for control of the optical device.

Another aspect relates to a method of operating an optical device, including providing information representative of incident direction of light, and adjusting a characteristic of the optical device according to such incident direction.

According to an aspect of the invention, an auto-darkening lens (ADL) control includes a sensor to sense the incident direction of welding light to an ADL, and a control circuit responsive to incident direction information to provide shade adjustment control for an ADL.

Another aspect relates to an ADL system including a liquid crystal shutter, including a liquid crystal cell and associated polarizers, a detector for detecting the direction of incident light on the liquid crystal shutter, and a circuit for driving the liquid crystal shutter to respective shades of light transmission according to the direction of such incident light.

Another aspect relates to a method of operating an ADL including providing information representative of incident direction of welding light to an ADL, and adjusting shade of such ADL according to such incident direction.

Many ADL's use photosensors to detect a welding arc and then to switch the LC shutter to the dark state. It is sometimes difficult to discern between welding light and non-welding (ambient) light. The ambient light in a welding environment can be made up of sunlight, overhead fluorescent, mercury vapor, incandescent, or a variety of other light sources. The ambient light incident on the photosensors can be greater than the welding light in some cases, and can have a larger AC component, making it difficult to discern from a welding arc by a standard photosensor. One difference between a welding arc and most ambient light, is that the welding arc usually is a point source of light coming from one direction and the ambient light comes from many directions. A point source detector could be constructed using an array of photosensors, or a single sensor with multiple photosensitive elements, and an aperture that directs the light from a point source to a single (or few) element(s), but allows the non-directional ambient light to fall on many of the elements. The signal from the element that the welding light falls on would be much greater than the other elements because the welding light would be concentrated on a single element, while the ambient light would be spread out over many elements. A simple circuit comparing the average signal from the elements to the peak signal would determine if a point source (welding) was present and switch the ADL.

An aspect of the invention relates to a light sensor including a generally linear array of photosensors, and an aperture arranged relative to the generally linear array to pass light from a light source to a limited number of the photosensors.

Another aspect relates to a light sensor for detecting location of a light source, including first and second light detectors, each light detector including a light transmitting opening and a number of light sensors arranged in a generally linear arrangement, the linear arrangement of one light detector being generally non-parallel to the linear arrangement of the other light detector.

Another aspect relates to a method of detecting light, including directing light through an opening to a generally linear arrangement of light sensors, whereby the intensity of light on one or several light sensors relative to the intensity of light on a number of other sensors is indicative of the direction of light through the opening.

Another aspect relates to a method of detecting light, including directing light through an opening to a generally linear arrangement of light sensors, whereby the intensity of light on one or several light sensors relative to the intensity of light on a number of other sensors is representative of detecting a point light source.

Another aspect relates to a method of detecting a point source of light, including directing light through a light transmitting opening to a generally linear arrangement of light detectors, whereby ambient light illuminates a number of light sensors and light from a point source of light illuminates a reduced number of light sensors.

Another aspect relates to a method of detecting the direction of incident light from a generally point light source, including carrying out the above method twice, once to detect one direction of incident light, and separately carrying out the above method to determine a different direction, and comparing the information from both directions as an indication of the direction of light from the point light source.

Another aspect is to determine the position or location of a welding arc or other bright light source relative to an auto-darkening lens.

These and other objects, features, advantages and functions of the invention will become more apparent as the following description proceeds.

It will be appreciated that although the invention is described with respect to one or more embodiments, the scope of the invention is limited only by the claims and equivalents thereof. It also will be appreciated that if the invention is described with respect to several embodiments, features of a given embodiment also may be used with one or more other embodiments.

Also, although the invention is described with respect to a welding shutter (also known as a light shutter) used in a welding helmet for eye protection therein, it will be appreciated that the various features of the invention may be used in conjunction with other devices and functions.

To the accomplishment of the foregoing and related ends, the invention, then, comprises the features hereinafter described in the specification and particularly pointed out in the claims, the following description and the annexed drawings setting forth in detail certain illustrative embodiments of the invention, these being indicative, however, of but several of the various ways in which the principles of the invention may be suitably employed.

DESCRIPTION

Figure 1A:
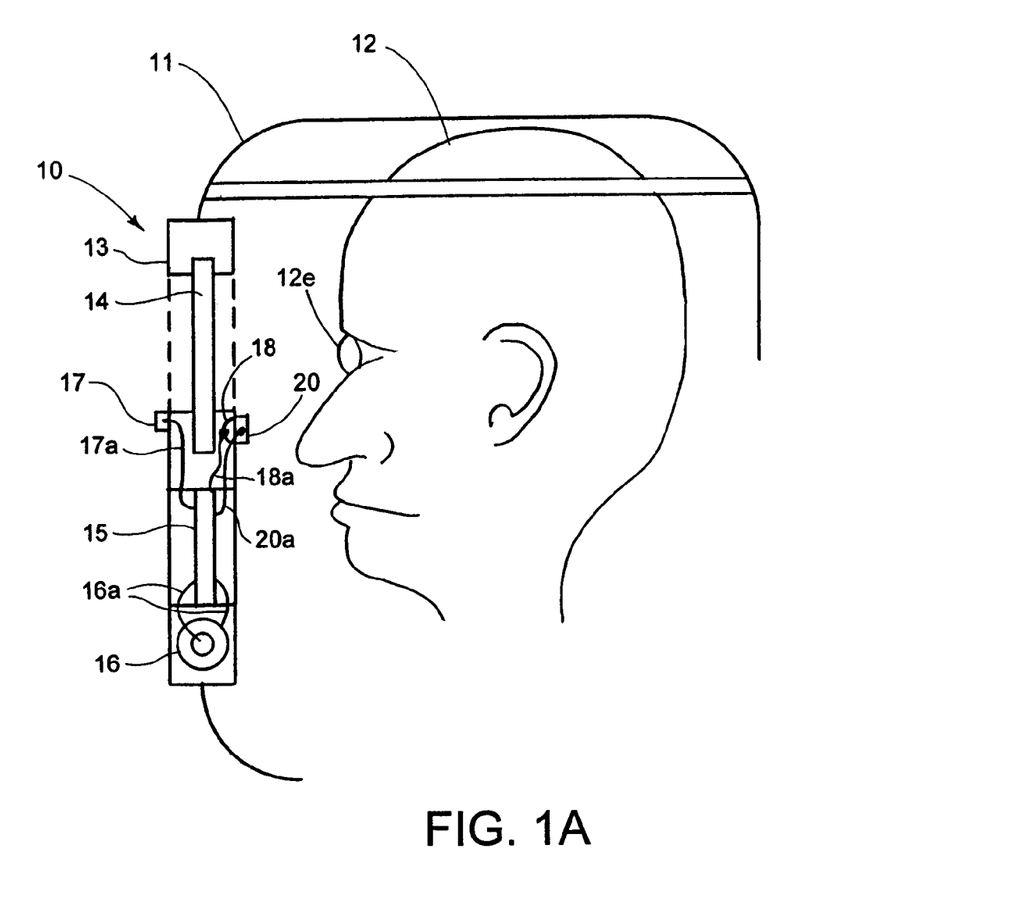
FIG. 1A is a schematic side elevation view, broken away, of an auto-darkening lens in a welding helmet in place on the head of a wearer.
Figure 1B:
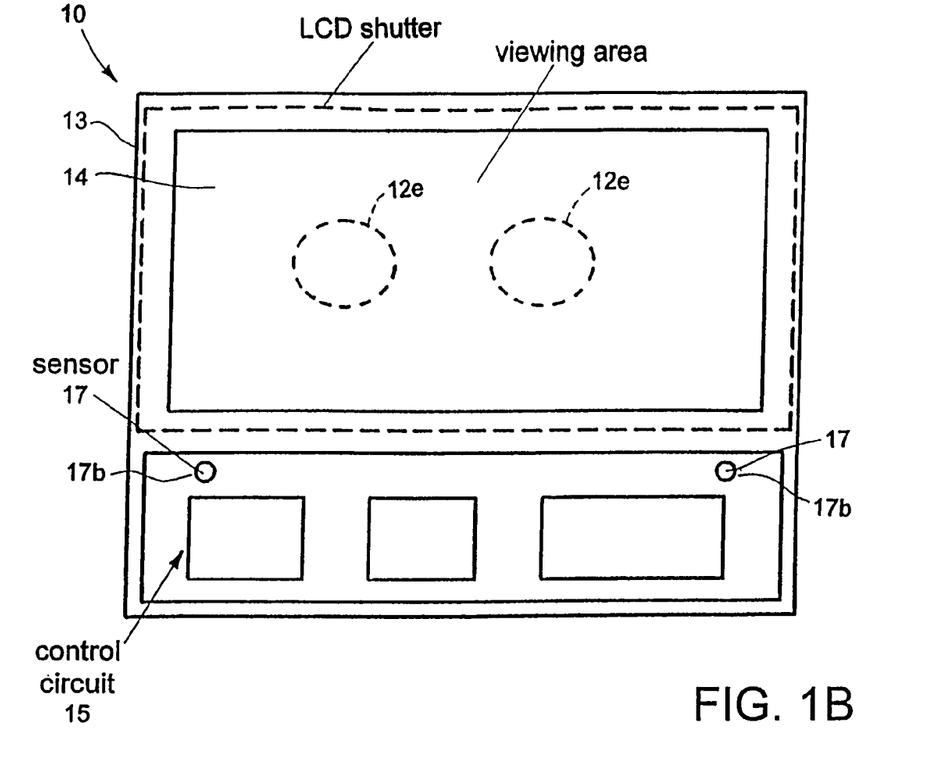
FIGS. 1B and 1C are, respectively, schematic front and side elevation views of an auto-darkening lens.
Figure 1C:
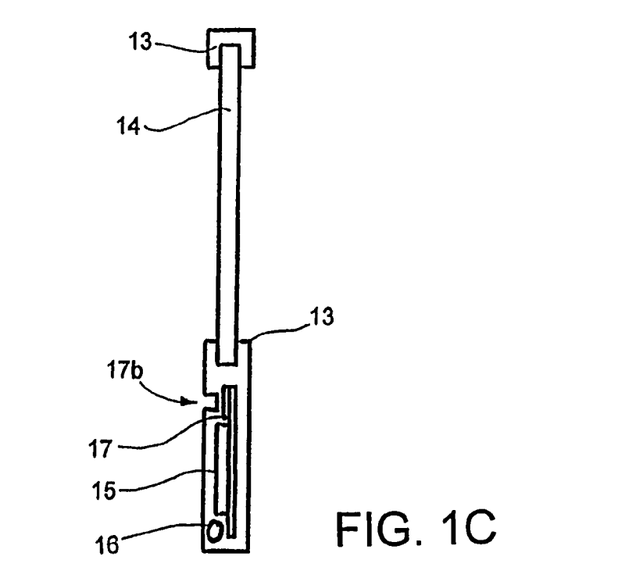

Referring, now, to the drawings, and initially to FIGS. 1A, 1B and 1C, an auto-darkening lens 10 is illustrated in a welding helmet 11 in position on the head of a wearer 12 (sometimes referred to as a user) to protect the user's eyes 12e. In the description below primed reference numerals are used to represent parts that are similar to parts that are designated by the same unprimed reference numeral. In the description below reference to directions, such as horizontal, vertical, left, right, up, down, is for relative reference only and is not intended to be limiting. The drawings are not necessarily to scale.

The auto-darkening lens 10 includes, for example, a support structure or housing 13, a variable light transmission shutter 14 mounted with respect to the support structure, operating circuitry 15 and power supply 16. Connections 16a couple the power supply 16 to provide power to the operating circuitry 15. Associated with the operating circuitry 15 a photosensor 17, which is coupled to the operating circuitry by connections 17a, to sense occurrence of a need for or a condition requiring the auto-darkening lens 10 to darken or to lighten, e.g., to decrease light transmission during welding or to increase light transmission in the absence of welding. The photosensor 17 may include several photosensors, and they may be placed in openings or recesses 17b or otherwise placed in association with the auto-darkening lens 10. The operating circuitry 15 operates the auto-darkening lens to various conditions of light transmission. Several control buttons and switches schematically shown at 18 in FIG. 1 are coupled by connections 18a to the operating circuitry 15 and may be operated by the wearer 12 to turn on the operating circuitry 15 to operate the shutter 14, e.g., to adjust desired shade, to set delay time, to set sensitivity, etc. As an example, the switches 18 may be membrane switches. The operating circuitry 15, power supply 16, photosensor 17, and buttons and switches 18 may be mounted on, in or part on and part in the support structure 13 or may be otherwise located, as may be desired. In using the auto-darkening lens 10 in the welding helmet 11, a wearer 12 may turn on the power and set the desired dark shade of the shutter 14 by using the buttons and switches 18; and the wearer then puts the welding helmet 11 on the head with the shutter in front of the eyes for viewing work. The shutter 14 may be in its relatively clear or high light transmission condition (or state) to allow the wearer to view the work; and upon sensing occurrence of welding, the photosensor 17 indicates the same to the operating circuitry to cause the shutter to assume a dark or relatively reduced light transmission condition (or state). When welding ceases, same may be detected and the operating circuitry allows the shutter to return to the relatively clear condition.

Indicators 20 indicate operating conditions of the auto-darkening lens 10. The indicators 20 may be coupled, as at 20a, to the operating circuitry or to some other device that operates the indicators. Examples of operating conditions may include, without limitation, the current shade or light transmitting condition of the shutter 14, e.g., is it clear or dark; reserve power supply power level, e.g, how much charge remains in the power supply (such as a battery) before becoming unable to supply adequate power to the operating circuitry 15 to operate the shutter 14; whether power from an external source is connected for operating the auto-darkening lens; whether the auto-darkening lens 10 is on, e.g., is receiving power to the operating circuitry 15; what shade level has been set, e.g., by the buttons and switches 18; what delay time and/or sensitivity has been set, e.g., by the buttons and switches 18; etc.

The indicators 20 may be of the type that provide a light output. For example, each indicator may be a light emitting diode, an organic light emitting diode, an incandescent bulb, a combination of a light source and a light modulating device, such as a liquid crystal light modulator, or other type of device that provides a light output or indication based on light in response to an appropriate energization. The light output may be the generating or emitting of light by a given light source or it may be modulation of the light from a light source. The light output may be white, may be of a given color, or may be of different respective colors. Operation of the indicators 20 may be provided by the operating circuitry 15. For example, the operating circuitry may provide respective signals and, if needed, power to cause respective indicators to provide a light output, to modulate light from a light source, to provide respective colors of light, etc. Such respective signals from the operating circuitry 15 may indicate the above-mentioned operating conditions of the auto-darkening lens 10 and/or other information that may be of interest, useful and/or needed by the wearer 12.

Figure 2:
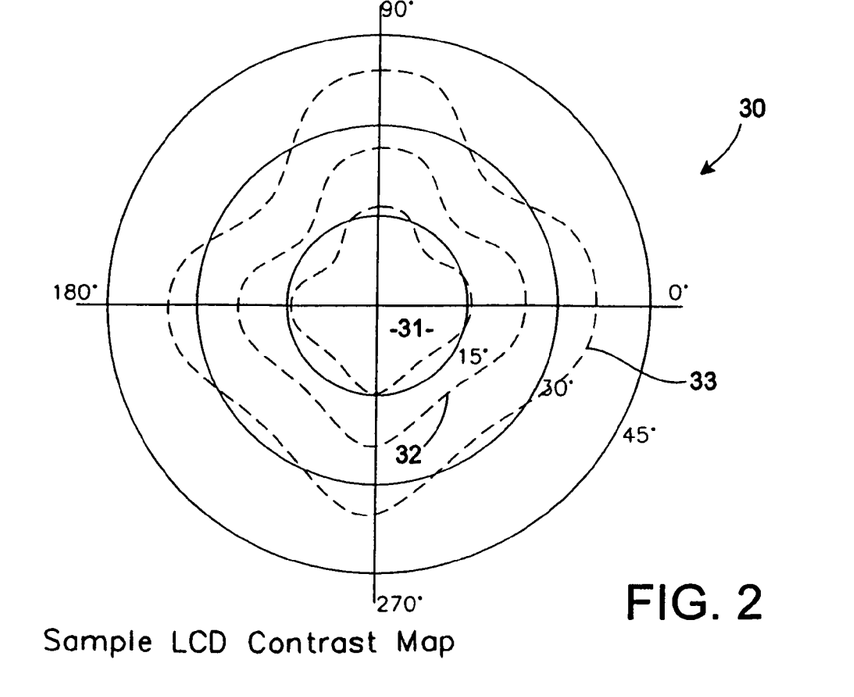
FIG. 2 is a schematic illustration of a contrast map showing an example of different contrasts at different angles of a liquid crystal shutter.

Turning to FIG. 2, a sample liquid crystal shutter contrast map is shown at 30. The map is shown with respect to transmission of light through a liquid crystal shutter such that light at an incident angle that is normal to the plane of the shutter is at the center and up to an incident angle of about 15 degrees to that normal is within the area of approximately constant contrast shown bounded by dash line 31. With the liquid crystal shutter 14 at a given energization level, for example, maximum contrast (light blocking) occurs in the area 31, which represents an area where light impinges on the liquid crystal shutter at an incident angle that is approximately perpendicular (normal) to the plane of the liquid crystal shutter to about 15 degrees relative to normal. The dash line 32 represents increased light transmission (reduced light blockage) by the liquid crystal shutter with respect to light that impinges thereon at an angle of between about 15 degrees and 30 degrees from the normal (perpendicular) direction, and dash line 33 represents the still further increased light transmission/reduced light blocking effect by the liquid crystal shutter for light that impinges thereon at an incident angle of about 30 degrees from the normal, and at some areas, e.g., along the 90 degree line, at an angle of from about 30 degrees to about 45 degrees from normal. The light blocking effect of the liquid crystal shutter for light impinging at an incident angle of 15 degrees or 30 degrees may be increased by increasing the voltage applied to the liquid crystal shutter 14 of the auto-darkening lens 10 (FIG. 1).

Figure 3:
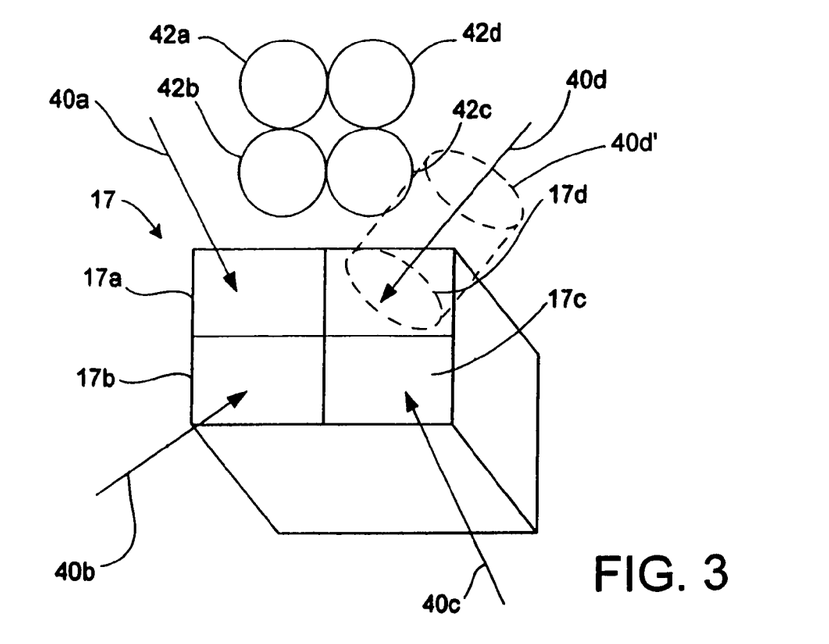
FIG. 3 is schematic illustration of a multiple unit photosensor for detecting light that is incident thereon at different respective angles.

In FIG. 3 a directional photosensor 17 is illustrated schematically. The directional photosensor 17 includes a number of light sensitive devices, such as photodiodes, photocells or some other device that senses light from welding, e.g., visible light, ultraviolet light, infrared light, or some other electromagnetic radiation produced as a result of welding. In the illustrated embodiment there are four photosensors 17a-17d. The photosensors 17a-17d may be designed to detect light that impinges thereon from a given incident angle, as is represented by the respective arrows 40a-40d. For example, the actual light sensitive portion of each photosensor may be located in a directionally oriented tube to limit the entrance angle of light to the photosensor to a given angle relative to normal, which is represented by line 41. One exemplary tube is schematically shown at 40d' in FIG. 3 as representative of other such tubes, if used. Lenses 42a-42d may be placed in front of each photosensor (in addition to or instead of the mentioned tubes) and be respectively oriented such that the respective lenses pick up and direct to a respective photosensor of the same suffix letter generally only light that is received at a given incident angle or range of incident angles.

The photosensor 17 may be mounted on the auto-darkening lens 10 support structure 13 or elsewhere so as to detect incident light that impinges thereon at respective angles, such as those illustrated. In use the respective photosensors 17a-17d provide signal outputs that are proportionally representative of the intensity of the light impinging thereon at the respective incident angles or approximately at such angles. As is described further below with respect to FIGS. 6 and 7 the respective outputs from the photosensors can be analyzed, compared, and/or otherwise used to provide an indication to the operating circuitry 15 of the direction from which the welding light is incident on the auto-darkening lens 10.

The photosensors 17a-17d may be, for example, four segmented photodiodes or other photosensitive device. Each photosensor may include several photosensors, each being directional to detect light at a given incident angle or approximately angle (or range of angles) and the arrangement of the several photosensors making up a photosensor, such as photosensor 17a, may be arranged to detect light impinging thereon over a range of incident angles.

Figure 4A:
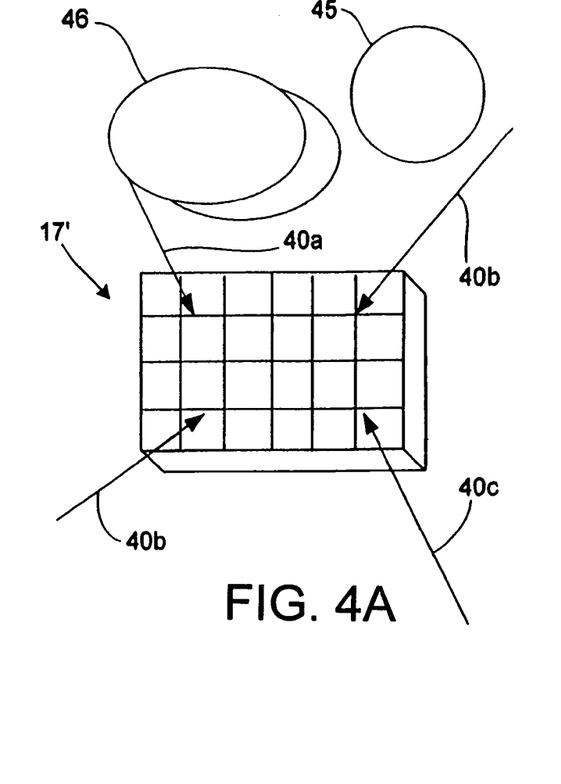
FIGS. 4A and 4B are schematic illustrations of a CCD (charge coupled device) for detecting light at respective incident angles.
Figure 4B:
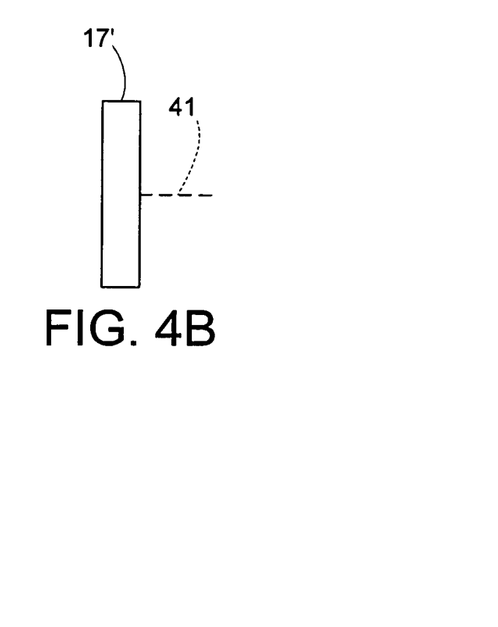

Briefly, referring to FIGS. 4A and 4B, another photosensor 17' is illustrated; such photosensor may be used as photosensor 17 in the auto-darkening lens 10 of FIG. 1. The photosensor 17' may be a so called camera type chip or photosensor, an example of which may be a charge coupled device (CCD) or some other device able to provide an electrical output in response to a light input. A lens 45 and/or a tubular light guide 46, which are schematically illustrated, may be used to guide light to the photosensor 17' so that different areas of the photosensor detect light impinging thereon at different respective incident angles. Thus, incident light at the normal 41 (FIG. 4B) would impinge on the entire area of the photosensors 17' whereas incident light at one of the respective incident angles 40a-40d would be received primarily at a given respective section of the photosensor 17'. Information from the photosensor 17' representing the intensity and the incident angle of the light impinging on the photosensor 17' may be used as will be described further below.

Referring to FIGS. 5A-5D, a multi-element photosensor unit 50 is illustrated. The unit 50 includes a vertical direction (or elevation) responsive photosensor unit 50v and a similar horizontal direction responsive photosensor unit 50h. If only one direction needs to be sensed, e.g., vertical or horizontal, only a respective one of the photosensor units 50v, 50h may be necessary for the unit 50. Each unit 50v, 50h includes a housing 51, a cover 52 on the front of the housing, an opening, such as a hole or an aperture, in the illustrated embodiment a slit aperture 53, in the cover, and a respective linear array 54v (in unit 50v), 54h (in unit 50h) of photosensors in the interior of the housing. A lens and/or a light transmitting or filtering device may be associated with, e.g., positioned in or outside of, the aperture. The photosensors 54v, 54h may be a respective linear array of photodiodes or other devices to sense light impinging thereon. In the illustrated orientation of the unit 50v, the slit aperture 53 is generally horizontal; and the linear array of photosensors 54v is oriented in a generally vertical direction. In the unit 50h the slit aperture 53 is generally vertically oriented, and the linear array of photosensors 54h is oriented in a generally horizontal direction. The photosensors 54v, 54h may be coupled to circuitry 55 for determining the intensity and incident direction of light impinging on the photosensors and, thus, the auto-darkening lens 10 based on which of the photosensors in the arrays are receiving light and the intensity thereof. The functions of the circuitry 55 may be carried out in the operating circuitry 15.

The slit apertures are generally linear, but if desired they may be of another shape. The slit apertures are shown linear and generally perpendicular to the direction of the generally linear arrays of photosensors. Such relation of the directions of the respective apertures and photosensor arrays should be other than parallel; they could be other than perpendicular provided they cooperate suitably to provide an indication of point source of light and direction of incident light when a point source is occurring and providing light thereto. It is advantageous to detect existence of a point source of light, as such point source may be indicative of welding. Many auto-darkening lenses used in welding employ fixed filters to filter ultraviolet and/or infrared light (radiation), but such lenses do not detect existence of point sources. Light from a point source can impinge on the eye of an individual and be focused on the retina so as possibly to cause eye damage.

Figure 5A:
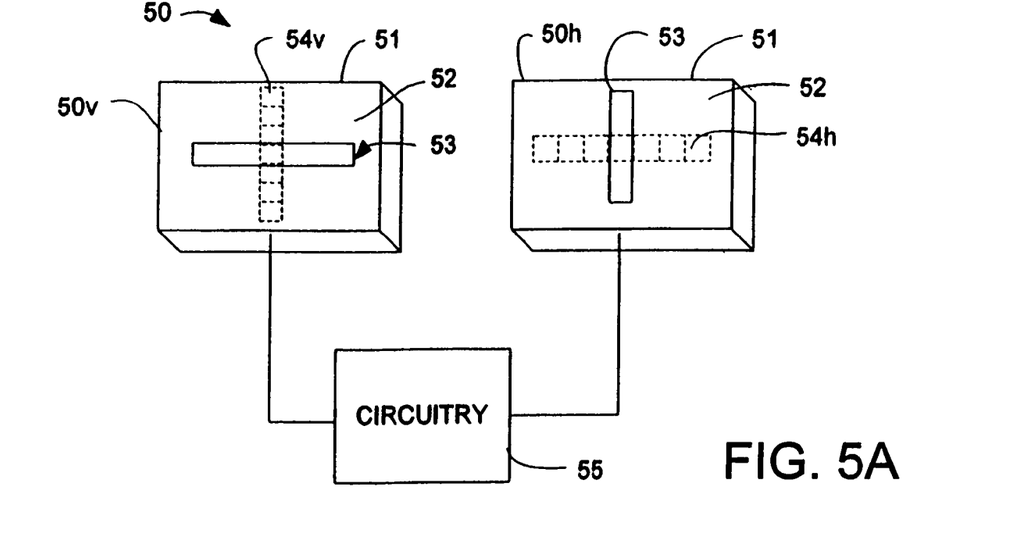
FIG. 5A is a schematic illustration of two multi-element photosensor units and associated circuitry for sensing incident angle of light incident thereon and on an auto-darkening lens.
Figure 5B:
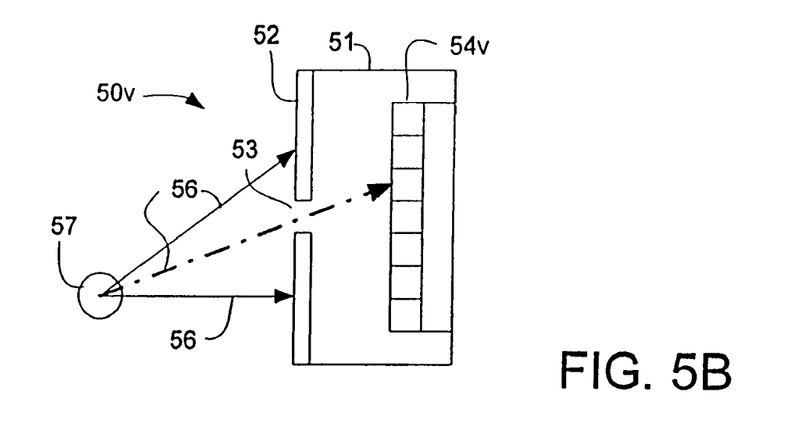
FIGS. 5B and 5C are side elevation views broken away of a vertical direction sensing multi-element photosensor unit.
Figure 5C:
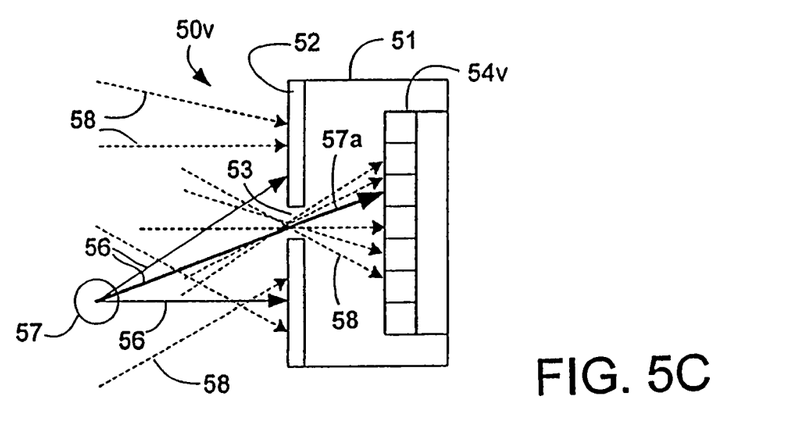

As is illustrated in FIG. 5B, light 56 from a point source 57, e.g., light that occurs at the location of welding on account of the welding process, is directed to the unit 50. The photosensor or photosensors in the vertical array 54v that sense light passing through the slit aperture 53 provide responses that the circuitry 55 uses to determine the incident angle of the light in a direction (or angle) up or down from normal. The cover 52 blocks light from the point source other than that which passes through the slit aperture 53. Since the impinging light 56 from the point source 57 illuminates only one or several of the photosensors in the vertical array 54v, for example, depending on the width (illustrated narrow direction) of the slit aperture and the distance of the point source 57 from the slit aperture, such illumination can be distinguished from ambient light 58, which is shown in FIG. 5C. For example, in FIG. 5C of the ambient light 58 that impinges on the cover 52, some of such light passes through the slit aperture 53 to the linear array 54v. Since the ambient light is relatively uniformly distributed as compared to the point source 57 of light 56, such ambient light relatively uniformly illuminates each (or more than a few, even many) of the photosensors in the linear array 54v. Due to such uniform illumination of the photosensors in the linear array 54v by the ambient light, the circuitry 55 is able relatively easily to discern the same as ambient light and is able to discriminate the light 56 therefrom, which would be illuminating a smaller number of the photosensors or even only one of them. Similarly, if the incident light is not truly ambient light but is from other than a point source as sharp or pointed as the welding light source 57, the fact that a number of the photosensors in the linear array 54v receive incident light also facilitates distinguishing the point source from the non-point source of light.

Figure 5D:
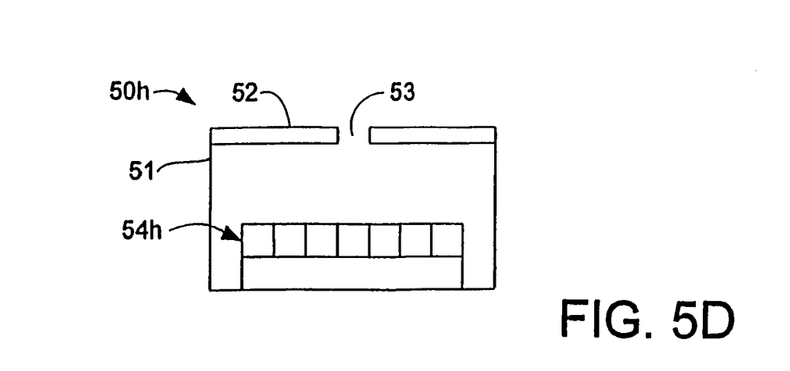
FIG. 5D is a side elevation view broken away of a horizontal direction sensing multi-element photosensor unit.

The horizontal unit 50h in FIG. 5D is similar in operation to the vertical unit 50v, except the horizontal unit obtains information pertaining to the direction of the point source 57 in a horizontal direction from the normal to the auto-darkening lens, for example.

Other types of directionally responsive photosensors are commercially available and may be used as photosensor 17 to detect light intensity at respective individual angles to determine the direction of incident light. Such photosensors and the associated circuitry, which may use ratios, comparisons or other techniques, and may use other information from the photosensors provide information for use to determine light intensity and incident angle of impingement on the photosensor and, thus, on the auto-darkening lens 10 (and the shutter thereof).

Using one of the photosensors 17, 17', 50 or some other device to provide information indicating the direction from which welding light is coming, the voltage operating the liquid crystal shutter 14 of an auto-darkening lens 10 could be changed to assure there is adequate light attenuation provided for impinging light received at the incident angle corresponding to such direction. The shade number for the auto-darkening lens, e.g., the amount of attenuation or the extent of dark state, of the auto-darkening lens can be set, and the voltage or other power input applied to the auto-darkening lens can be adjusted automatically to maintain that level of light attenuation for light that impinges on the auto-darkening lens from the particular incident angle.

In using one of the photosensors 50, e.g., the horizontal unit 50h, it will be appreciated that ambient light enters the slit aperture and illuminates a number of the photosensors in the generally linear array of photosensors. However, light from a point light source tends to enter the slit aperture and to illuminate a reduced number (even as few as one) of photosensors than usually would be illuminated by ambient light. A peak signal detector circuit in the operating circuitry 15 may detect the outputs from the reduced number of photosensors, and a comparator in the operating circuitry may detect the relatively lower level outputs from the other photosensors that are responding to ambient light-or may detect the outputs from both all or some other set of the photosensors. By detecting the peak output, though, which usually would be reasonably larger than the reduced output on account of ambient light or on account of a combination of ambient light and peak output light, a comparator circuit in the operating circuitry 15 would be able to determine, to discern, to detect, etc., whether point source light is impinging on the horizontal unit 50*h*. Since a photosensor output for a point source of light would be rather larger than that due to ambient light, a relatively large signal to noise ratio may be obtained to enhance the accuracy of point source light detection. By determining the location along the generally linear array of photosensors relative to the location of the slit aperture, by triangulation, etc., the operating circuitry 15 would be able to determine the angle at which the incident light is impinging on the photosensor and unit 50*h*. Furthermore, by doing the same detection and circuitry analysis of detected light by the unit 50*v*, the point source, if any, also can be detected and the direction of the incident light relative to the unit 50*v* can be determined. By comparing the detections of direction by both units 50*h* and 50*v*, the direction of the incident light can be detected.

As an example of comparison of average output of the photosensors to the peak output of the photosensor(s), the peak output from a point source usually would be some multiple of the average. The multiple may be determined by the number of elements in the photosensor array and the desired sensitivity threshold, for example. Usually, the more elements in the photosensor array, the higher would be the peak to average value, as there are more elements over which to determine the average, yet the peak value would remain about the same generally without regard to the overall number of elements in the multi-element linear array photosensor. This feature provides for improvement in signal to noise ratio whereby the peak value is reasonably larger, for example, than the average value.

Although the apertures in the units 50*h*, 50*v* are shown as slits, it will be appreciated that they may be holes, provided they provide space for ambient light and for point source light to enter the respective units and to impinge on at least one linear array of photosensors (if only one is used or only one direction is desired to be detected) or on both generally linear arrays of photosensors, in respective housings of the units 50*h*, 50*v*.

The invention also allows for detecting of functions occurring other than welding, but for which eye protection is desired or for functions that are used in conjunction with welding. For example, grinding operations may be associated with welding; e.g., prior to welding parts are ground or after welding grinding may be used to smooth or to remove extra material. Using the same auto-darkening lens arrangement, e.g., in a welding helmet, a person may carry out a welding operation during which the auto-darkening lens detects welding and protects the eyes of the person. However, during grinding when there is not such bright light and the bright light of sparks, etc., is rather dispersed, such latter light would not be as concentrated or as bright as a point source of welding; therefore, the detector system of the present invention would not respond to the grinding as being welding and would allow the controllable shutter of the auto-darkening lens to go to a clear state or possibly to an intermediate light transmission state between clear and dark. Therefore, there would not be a need to change welding helmets, goggles, safety glasses, etc., between a welding operation and a grinding operation. These only are but one example of such duality of use; but it will be appreciated that there are other possibilities of such multiple uses of the invention.

Figure 6:
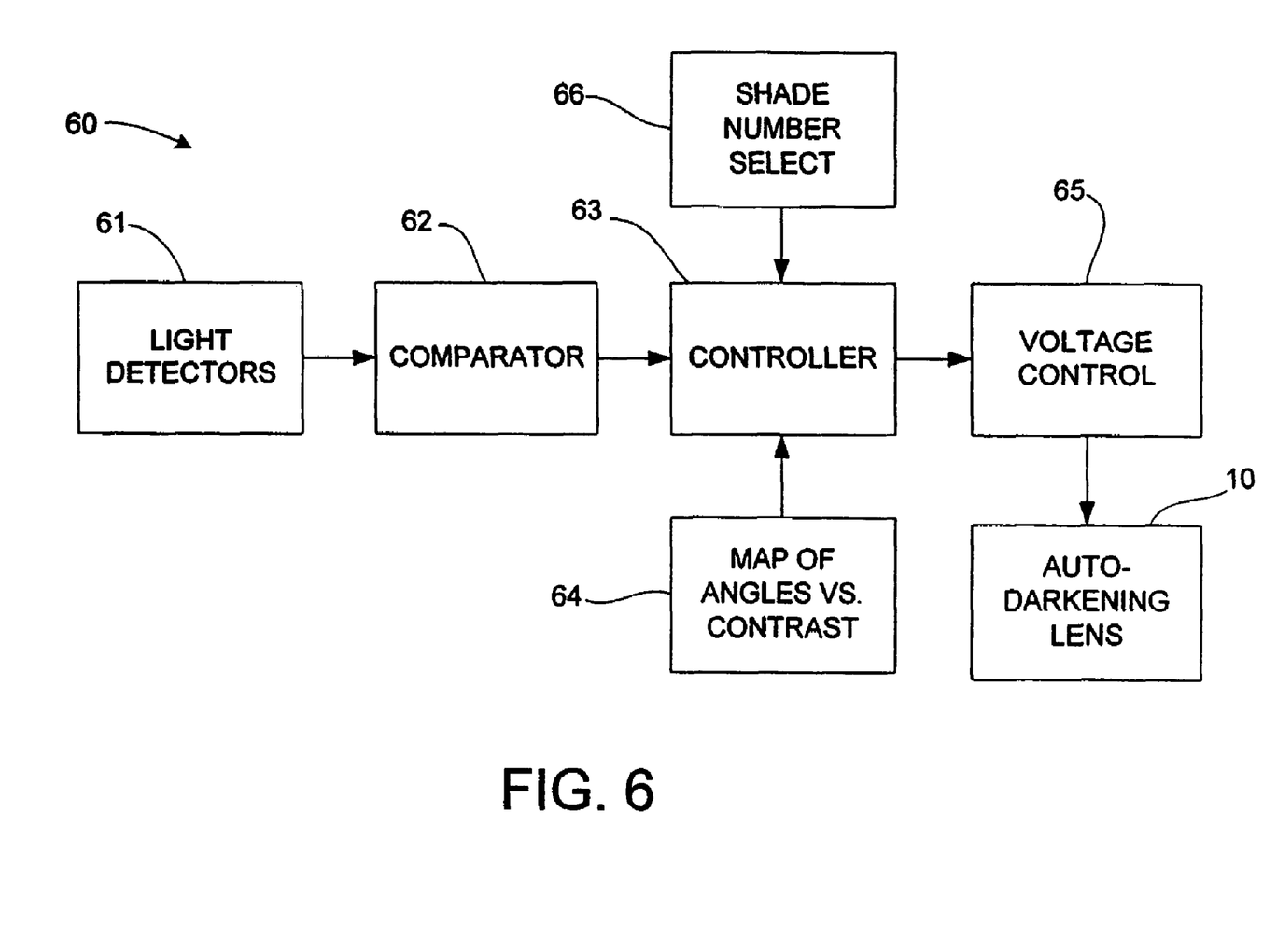
FIG. 6 is a schematic block diagram illustrating an example of an automatic angle of view compensation control system for an auto-darkening lens.

Referring to FIG. 6, a lens control 60 for operating an auto-darkening lens 10 to achieve a desired shade when in the dark state while providing automatic angle of view compensation is shown. The lens control 60 may be a portion of the operating circuitry 15. The lens control 60 includes light detectors 61, a comparator 62, and a controller 63 with an associated memory 64 that contains angle information, e.g., map of incident angles versus contrast characteristics of the auto-darkening lens 10. The controller 63 is coupled to the voltage control 65, which may be a standard voltage control or driving circuit for an auto-darkening lens 10. The output from the controller 63 operates the voltage control 65 to drive the auto-darkening lens 10 to a desired shade according to the incident angle of light impinging on the auto-darkening lens as detected by the light detectors 61. An input 66 to the controller 63 allows a user to designate a desired shade number for the auto-darkening lens in the dark state. The controller 63 provides its output to the voltage control 65 to maintain such shade number characteristic for the auto-darkening lens 10 for light that is incident on the auto-darkening lens at an angle that is detected by the light detectors 61.

The light detectors 61 may be the photosensors 17, photosensors 17', photosensor unit 50 or some other device that senses light according to the direction at which the light is impinging on the light sensitive device. The comparator 62 may be a conventional comparator circuit that determines from the inputs provided by the light detectors 61 the direction at which the impinging light is incident on the light detectors. As one example using as inputs to a comparator 62 signals representative of light impinging on one or more photosensors, the comparator may determine which of the photosensors is receiving the brightest or highest intensity light and, therefore, is providing an electrical signal representative thereof. For example, the comparator 62 may receive an input from the circuitry 55 as a representation of the direction of incident light (incident angle) from the point source 57. The comparator 62 may be the circuitry 55. The comparator 62 may compare all of the inputs to it and provide its output as a signal representing which of the photosensors is receiving the brightest input. The comparator 62 may determine ratios of the detected light intensities by the photosensors, e.g., the photosensors 17*a*-17*d*, to determine the direction of the light incident angle to the auto-darkening lens, as well as the light intensity. The comparator may determine which of the one or more photosensors in a linear array of photosensors, as in the units 50*h*, 50*v* is receiving light and the intensity of that light; and using that information the comparator also may provide information indicating whether the incident light is from a point source and, if so, what is the incident direction of the incident light.

The controller 63 may be a processor, a special circuit, e.g., an asic, or another circuit capable of receiving direction information from the comparator 62, desired shade number from the input 66, and map information from the memory 64 to determine the voltage at which the voltage control 65 should operate the auto-darkening lens 10 to obtain the desired shade number for the incident angle of the impinging light. The map information in the memory 64 may be a look up table that indicates the voltage or other power level, etc. that should be provided to the liquid crystal shutter 14 of the auto-darkening lens 10 to achieve the desired shade number for light impinging on the auto-darkening lens at respective incident angles. The memory 64 may include software and/or firmware for operating the controller 63 or the controller 63 itself may include the appropriate software and/or firmware to carry out the described functions. It will be appreciated that a person who has ordinary skill in the art would be able to write appropriate code to carry out the described functions in a language suitable for a selected processor, an asic, etc., to respond to inputs from the comparator 62 and shade number input 66, and to call on angle information from memory 64 to operate the voltage control 65 to drive the auto-darkening lens 10 to desired shade for the determined incident angle of impinging light. As an example, the lens control 60 would be able to sense the incident angle of the impinging light that is due to welding and to increase or to decrease the voltage applied by the voltage control 65 to the auto-darkening lens 10 to obtain the proper shade. The voltage applied to the auto-darkening lens would be determined by the contrast map information, such as that shown at FIG. 2, whereby the voltage applied to the auto-darkening lens 10 would be determined by that map of information concerning incident angle versus contrast characteristics to achieve the desired shade number for the determined incident angle.

The comparator 62 and/or the circuitry 55 may be used in a manner that in effect subtracts ambient light 58 from point source light 57*a* from point source 57. As is seen in FIG. 5C both light from point source 57 and ambient light 58 may reach the multi-element photosensor array 54*v* and/or 54*h*. However, the point source light 57*a* usually is brighter than ambient 58; and the ambient light 58 usually is more uniformly distributed over the photosensors of the multi-element photosensor array. Therefore, the circuitry 55 and/or the comparator 62 may subtract out signals (or values) representing the ambient light 58 to leave only the signals representing (or values) representing the point source light 57*a* and, additionally, may determine which of the photosensors is receiving the point source light, thereby to determine the direction of the incident angle and, thus, of the incident light. Since the circuitry 55 and/or comparator 62 may compare a peak signal with an average signal it is relatively easy to discriminate between the two and, therefore, to determine the signals that need to be separated, subtracted, etc. to determine the point source light 57*a* and the direction from which it is arriving at the photosensors. The accuracy of determining the incident angle may depend, for example, on the number of photosensors of a given linear array 54*v*, 54*h* on which point source light 57*a* impinges; and that number of photosensors may be reduced, for example, by reducing the size of the slit aperture 53 so that, on the one hand it is relatively small width, while on the other hand being adequately wide to allow entry of adequate amount of light for detection by the photosensor(s) of the multi-element photosensor array 54*v*, 54*h*.

In the present invention the lens control 60 responds to position or direction of the incident light. A preset shade can be set, and the lens control 60 maintains that shade for the incident angle at which light is impinging on the auto-darkening lens and does not have to rely on detecting light that has transmitted through the auto-darkening lens.

Figure 7:
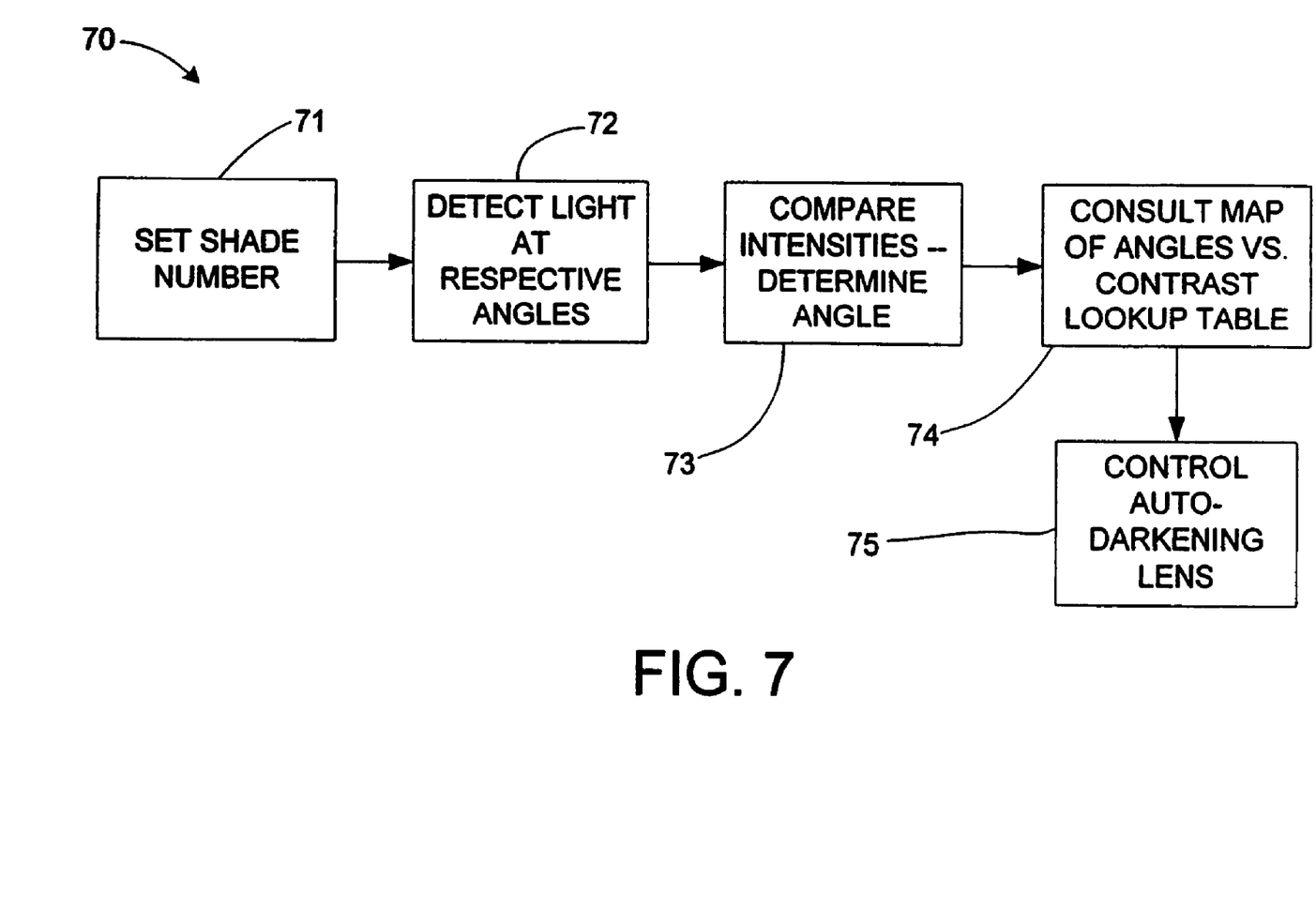
FIG. 7 is a schematic block diagram illustrating a method of providing automatic angle of view compensation for an auto-darkening lens.

Briefly referring to FIG. 7, a method of carrying out the invention is illustrated at 70. In the flow chart or method 70, at block 71 shade number is set, e.g., using the control 66 of the lens control 60 shown in FIG. 5. At block 72 light is detected at respective angles, for example, using the light detectors 61. At block 73 the light intensities are compared and the incident angle is determined. For example, using the comparator 62 to compare the outputs, to take ratios from the light detectors, the incident angle is determined, and at block 74 the map of angles versus contrast characteristics is addressed in the memory 64 by the controller 63 to determine from a look up table, in the memory 64, for example, the voltage at which the auto-darkening lens 10 is to be driven to achieve the desired shade number at the determined incident angle. At block 75 the auto-darkening lens is controlled by the controller 63 to operate the voltage control 65 to drive the auto-darkening lens 10 at the desired voltage.

It will be appreciated that the lens control 60 operating according to the method 70 may drive the auto-darkening lens 10 to the desired shade for the immediate incident angle of impinging light. The auto-darkening lens 10 would be driven at an appropriate voltage to achieve the desired shade number for the direction, e.g., the incident angle, of the impinging light.

Figure 8:
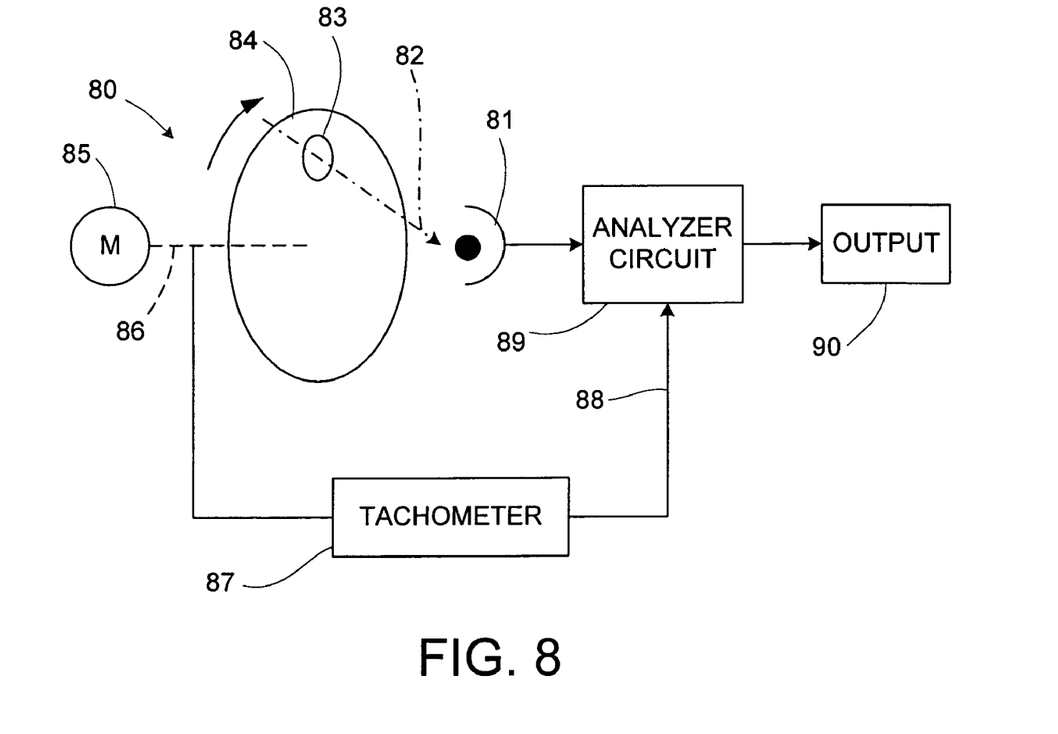
FIGS. 8 and 9 are schematic illustrations of a mechanical system for detecting direction of incident light.
Figure 9:
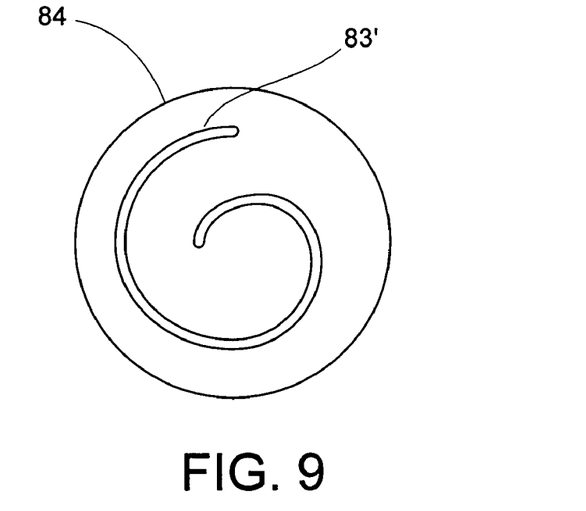

Turning to FIGS. 8 and 9 another embodiment of detector and controller system for an optical device, e.g., a filter, lens, auto-darkening lens, etc., as was described above and equivalents thereto, is illustrated at 80. The system 80 includes a photosensor 81 on which light 82 is incident. The direction at which the light 82 is incident depends on the location of the source of the light and the relative position of a movable aperture 83 relative to the photosensor 81. The movable aperture 83 is located in a rotating wheel 84, e.g., a circular metal, plastic or other material wheel that is generally non-transmitting of light except at the location of the aperture 83. The aperture may be a circular aperture, as is illustrated at 83; the aperture may be a spiral slot, as is illustrated at 83' in FIG. 9; and the aperture may be some other shape or configuration. A motor 85 is coupled by a drive shaft 86 to the wheel 84 to rotate the wheel. A tachometer 87 is coupled either to the motor 85, drive shaft 86 or wheel 84 to provide an indication at 88, e.g., a number of tachometer pulses, a digital or analog signal, or some other information on line 88, that is representative of the location of the aperture 83 to the photosensor 81. An analyzer circuit 89 receives inputs from the photosensor 81 and tachometer 87 and provides information to an output device, display or circuit 90 that is representative of the direction of incident light 82. The analyzer circuit 89 may be a comparator, memory, computer, logic circuitry, and include suitable programming to determine, based on the intensity of light on the photosensor 81 and the relative location of the aperture or orientation of the aperture 83, 83', the direction of the incident light and whether the incident light is from a point source or is generally uniform ambient light. For example, if the light is generally uniform ambient light, the intensity of light on the photosensor 81 would not vary substantially as the wheel 84 rotates. However, if the light incident on the photosensor 81 varies during rotating of the wheel 84, the location of the aperture 83, 83' relative to the photosensor 81 when light is of a maximum or minimum intensity can be determined and can be used to compute the incident light direction, e.g., from a point source. Similarly, if the intensity of light varies incident on the photosensor during rotating of the wheel 84, other characteristics of the incident light may be determined by the analyzer circuit 89. The information determined by the analyzer circuit 89 may be output for display or for use by the output 90, for example, to control an optical device, e.g., a lens, shutter, auto-darkening welding lens or other device, or to show the direction of the incident light.

If desired other mechanical or semi-mechanical devices may be used equivalently to the aperture 83 and rotating wheel 84. For example, a scanning mirror or lens device, a wobble mirror device, a variable opening and closing shutter may be used to direct light or to limit light to one or more photosensors 81. Based on light incident on the photosensor and the physical location, orientation and/or extent of opening of the mechanical or semi-mechanical device, the direction of incident light and/or whether the incident light is from one or more point sources of light can be determined as above using the analyzer circuit 89, for example.

From the foregoing, it will be appreciated that the invention may be used with auto-darkening lenses to achieve a desired shade number while compensating for the angle at which incident light is impinging on the auto-darkening lens. The invention also may be used with other optical devices to adjust a characteristic thereof based on incident light direction or angle.

The invention claimed is:

1. A control for a controllable optical device, comprising an auto-darkening lens,
a sensor to sense the incident direction of incident light toward the auto-darkening lens,
a control circuit responsive to incident direction information to provide for control of the auto-darkening lens,
wherein the control circuit provides for shade adjustment control for the auto-darkening lens to maintain at least a desired light attenuation shade for different directions of incident light,
said sensor comprising a photosensor, said photosensor comprising a plurality of photosensors, and
further comprising a light restricting opening limiting the direction at which light may impinge on one or more of said photosensors.

2. The control of claim 1, said light restricting opening comprising a tube.

3. The control of claim 1, said light restricting opening comprising an aperture.

4. The control of claim 3, said aperture comprising an elongate aperture.

5. The control of claim 4, a number of said photosensors arranged in a generally linear array and said elongate aperture extending in a direction generally perpendicular to the direction of said generally linear array.

6. The control of claim 5, said sensor comprising at least two arrangements of generally linear arrays of photosensors oriented relative to respective elongate apertures that are generally perpendicular to the respective arrays.

7. A control for a controllable optical device, comprising an auto-darkening lens,
a sensor to sense the incident direction of incident light toward the auto-darkening lens,
a control circuit responsive to incident direction information to provide for control of the auto-darkening lens,
wherein the control circuit provides for shade adjustment control for the auto-darkening lens to maintain at least a desired light attenuation shade for different directions of incident light,
said sensor comprising a photosensor, said photosensor comprising a plurality of photosensors, and
further comprising a lens for restricting the direction at which light impinges on the photosensors.

8. A control for a controllable optical device, comprising an auto-darkening lens,
a sensor to sense the incident direction of incident light toward the auto-darkening lens,
a control circuit responsive to incident direction information to provide for control of the auto-darkening lens,
wherein the control circuit provides for shade adjustment control for the auto-darkening lens to maintain at least a desired light attenuation shade for different directions of incident light,
said sensor comprising a photosensor, and
further comprising a shutter to control light incident on the sensor.

9. The control of claim 8, said shutter comprising a movable aperture.

10. The control of claim 9, further comprising a motor for moving the aperture.

11. The control of claim 10, said aperture being in a rotatable member, and said motor being operative to rotate said rotatable member.

12. The control of claim 11, said aperture comprising a generally circular opening in the rotatable member.

13. The control of claim 11, said aperture comprising a slot in the rotatable member.

14. The control of claim 11, said aperture comprising a helical slot.

15. The control of claim 9, further comprising analyzer circuit responsive to outputs from the photosensor and the relative location of the aperture to the photosensor to provide an indication of incident light direction.

16. The control of claim 9, further comprising analyzer circuit responsive to outputs from the photosensor and the relative location of the aperture to the photosensor to provide an indication of whether the incident light is from at least one point source of light.

* * * * *